(12) United States Patent
Oki et al.

(10) Patent No.: US 6,622,697 B2
(45) Date of Patent: Sep. 23, 2003

(54) ENGINE IDLING CONTROL DEVICE

(75) Inventors: Hideyuki Oki, Saitama (JP); Atsushi Izumiura, Saitama (JP); Asao Ukai, Saitama (JP); Shinichi Kitajima, Saitama (JP); Atsushi Matsubara, Saitama (JP); Yasuo Nakamoto, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/735,483

(22) Filed: Dec. 14, 2000

(65) Prior Publication Data

US 2001/0004888 A1 Jun. 28, 2001

(30) Foreign Application Priority Data

Dec. 14, 1999 (JP) .......................................... P.11-354394

(51) Int. Cl.⁷ ............................................... F02D 41/08
(52) U.S. Cl. ................................................ 123/339.14
(58) Field of Search ....................... 123/339.14, 339.16, 123/339.17, 339.18, 339.23, 587

(56) References Cited

U.S. PATENT DOCUMENTS 4,709,674 A * 12/1987 Bianchi et al. ........ 123/339.23
5,163,295 A   11/1992 Bradshaw ..................... 60/605
5,216,610 A *  6/1993 Douta et al. ................. 701/103
5,289,807 A    3/1994 Yonekawa .................. 123/325

FOREIGN PATENT DOCUMENTS

EP      0 882 880 A2    12/1998
JP         2859530      12/1998

* cited by examiner

*Primary Examiner*—Andrew M. Dolinar
(74) *Attorney, Agent, or Firm*—Arent Fox Kintner Plotkin & Kahn

(57) ABSTRACT

An engine idling control device includes a secondary air supply device, an intake gauge pressure detecting unit and a secondary air supply control unit. The secondary air supply device is disposed on a bypass intake passage communicating with an intake pipe and bypassing a throttle valve. The intake gauge pressure detecting unit detects an intake gauge pressure on the intake pipe side. The secondary air supply control unit controls the secondary air supply device so as to open and close the bypass intake passage when an engine is in an idling state. The secondary air supply device is controlled to obtain the optional opening value. The secondary air supply control unit controls such that the secondary air supply device increases the opening value when the intake gauge pressure becomes higher than a predetermined low load condition in an idling state.

3 Claims, 3 Drawing Sheets

ENGINE IDLING CONTROL DEVICE

BACKGROUND OF THE INVENTION

1. Field of the Invention

The present invention relates to an engine idling control device in which an air flow rate control valve is provided along a passage for bypassing a throttle valve and supplying auxiliary or secondary air into an intake pipe.

2. Description of the Related Art

In a normal idling condition of an automotive engine, a negative pressure (for example, −73 kPa (in the order of −550 mmHg)) is generated within an intake pipe of a throttle body when a throttle valve is in a fully closed state. To this end, there has been proposed an automotive engine in which a bypass intake passage is provided on a throttle body, for establishing a communication between an upstream and a downstream side of the throttle valve, whereby a required amount of intake air is supplied by a secondary air supply device such as an RACV or an EACV (an idle control valve) for controlling the opening of the bypass intake passage to thereby perform the idling control of the engine (for example, Japanese Patent No. 2859530).

In an idling condition, however, when the engine load is increased by putting in the operation of several lamps and an air conditioner, in order to cope with the engine load, the opening value of an RACV is increased, but the intake negative pressure decreases (for example, about 29 kPa (in the order of −220 mmHg)), and this causes a problem that a sufficient quantity of intake air cannot be obtained even with the same opening area.

In addition, the recent growing tendency toward energy conservation demands highly fuel economy vehicles, and as a result of such a demand, for example, a so-called hybrid vehicle has been provided in which an engine (an internal combustion engine) and an electric motor are used in combination. Among the hybrid vehicles, there is a vehicle using a small displacement, high compression ratio engine with a view to improving the fuel economy.

However, in the small displacement, high compression ratio engine, the engine torque tends to become insufficient due to the small displacement, and the knocking toughness is reduced due to the high compression ratio. Due to this, particularly at the time of parking while idling in a high temperature atmosphere, the ignition timing is retarded, whereby the intake gauge pressure becomes higher than the normal level, a high load being thereby applied to the engine. When this takes place, the difference in pressure between the upstream side and the downstream side of the secondary air supply device becomes small, and therefore this causes a problem that an expected quantity of secondary air cannot be obtained.

SUMMARY OF THE INVENTION

It is an object to realize an idling control device which can control an engine into a stable idling state against various factors increasing an engine load at the time of idling by solving the aforesaid problem, in particular, for a small displacement, high compression ratio engine.

According to the invention, there is provided an engine idling control device having a secondary air supply device provided along a bypass intake passage communicating with an intake pipe and bypassing a throttle valve, an intake gauge pressure detecting unit for detecting an intake gauge pressure on the intake pipe side, and a secondary air supply control unit for controlling the secondary air supply device so as to open and close the bypass intake passage when an engine is in an idling state, wherein the secondary air supply device is controlled so as to put in any state the opening value relative to the bypass passage, and wherein the secondary air supply control unit controls such that the secondary air supply device increases the opening value relative to the bypass intake passage as the intake gauge pressure becomes higher than the predetermined low load condition in an idling state.

According to the construction, in the idling state, since the opening value of the bypass intake passage is varied in response to the variation of intake gauge pressure, even if the intake gauge pressure exceeds the normal level due to the influence of a retarded ignition timing, for example, at the time of parking while idling in a high temperature atmosphere, a high load being thereby applied to an engine, separately from the increase in load resulting when lamps and an air conditioner are turn on, a variation of intake gauge pressure resulting therefrom can be detected to be obtained a quantity of secondary air which can deal with the increased load.

In addition, the increasing rate of the opening value by the secondary air supply device can be controlled such that it becomes smaller depending on the intake gauge pressure becoming higher, and according to the construction, a required quantity of secondary air can be supplied in a more precisely and preferably control.

DETAILED DESCRIPTION OF THE PREFERRED EMBODIMENTS

A mode for carrying out the invention will be described in detail below with reference to an embodiment shown in the accompanying drawings.

Figure 1:
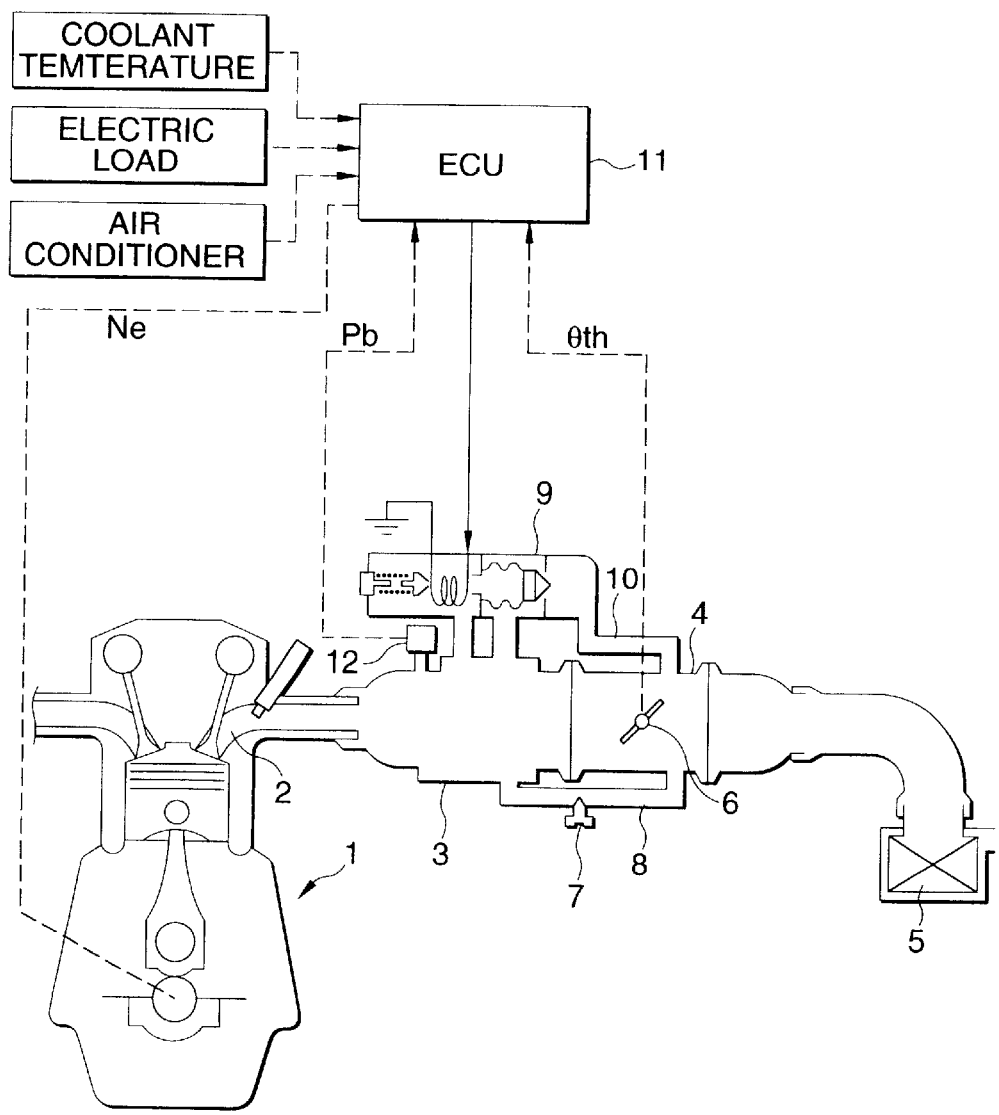
FIG. 1 is a diagram showing an intake system of an engine to which the invention is applied.

FIG. 1 is a diagram showing an intake system of an engine to which the invention is applied. For example, a throttle body 4 for adjusting the flow rate of intake air and an air cleaner 5 for removing dust in the atmosphere are connected in series to an intake pipe 3 connected in turn to an intake manifold 2 of respective cylinders of an engine 1 comprising, for example, an inline 4 cylinder engine.

Two bypass passages bypassing a throttle valve 6 are provided between an upstream side of the throttle valve 6 in the throttle body 4 and the intake pipe 3. One of the bypass passages is a slow air passage 8 for regulating the flow rate of basic idling air with a variable jet 7, and the other is a bypass intake passage 10 along which is provided a bypass air flow rate control valve 9 as a secondary air supply device (an RACV, an EACV or the like) which is controlled in response to the operating condition of the engine in a fully closed state in which mainly the throttle valve 6 is closed.

The correction of the air flow rate of idling air in response to a change in the coolant temperature, and increasing of electric load related to lamps or load related to an auxiliary apparatus such as an air conditioner is designed to be carried out by varying the opening area of the bypass intake passage 10 with the airflow rate control valve 9. Additionally, a compensation for an insufficient flow rate of intake air at the time of cranking and a correction of the air flow rate at the time of quick closing of the throttle valve are also carried out.

The air flow rate control valve 9 may be constituted by an electromagnetic control valve, the opening value of which is continuously controlled by controlling an exciting current to a coil. As shown in the FIG. 1, an electronic control unit 11 is provided as a secondary air supply control unit for controlling the air flow rate control valve 9, and inputted into the electronic control unit 11 is the information on the existence of the aforesaid electric load, on/off signals of the air conditioner, coolant temperature, engine speed Ne, throttle valve opening θth and the like.

In addition, a gauge pressure sensor 12 is provided as an intake gauge pressure detecting unit between the throttle body 4 and the intake manifold 2, and a detection signal representing an intake gauge pressure detected by the gauge pressure sensor 12 is also inputted into the electronic control unit 11. An automatic control of the air flow rate of intake air passing through the bypass intake passage 10 is performed through the opening adjustment by the air flow rate control valve 9 based on information including the above various pieces of information and the intake gauge pressure such that the then engine speed Ne becomes optimal.

Figure 2:
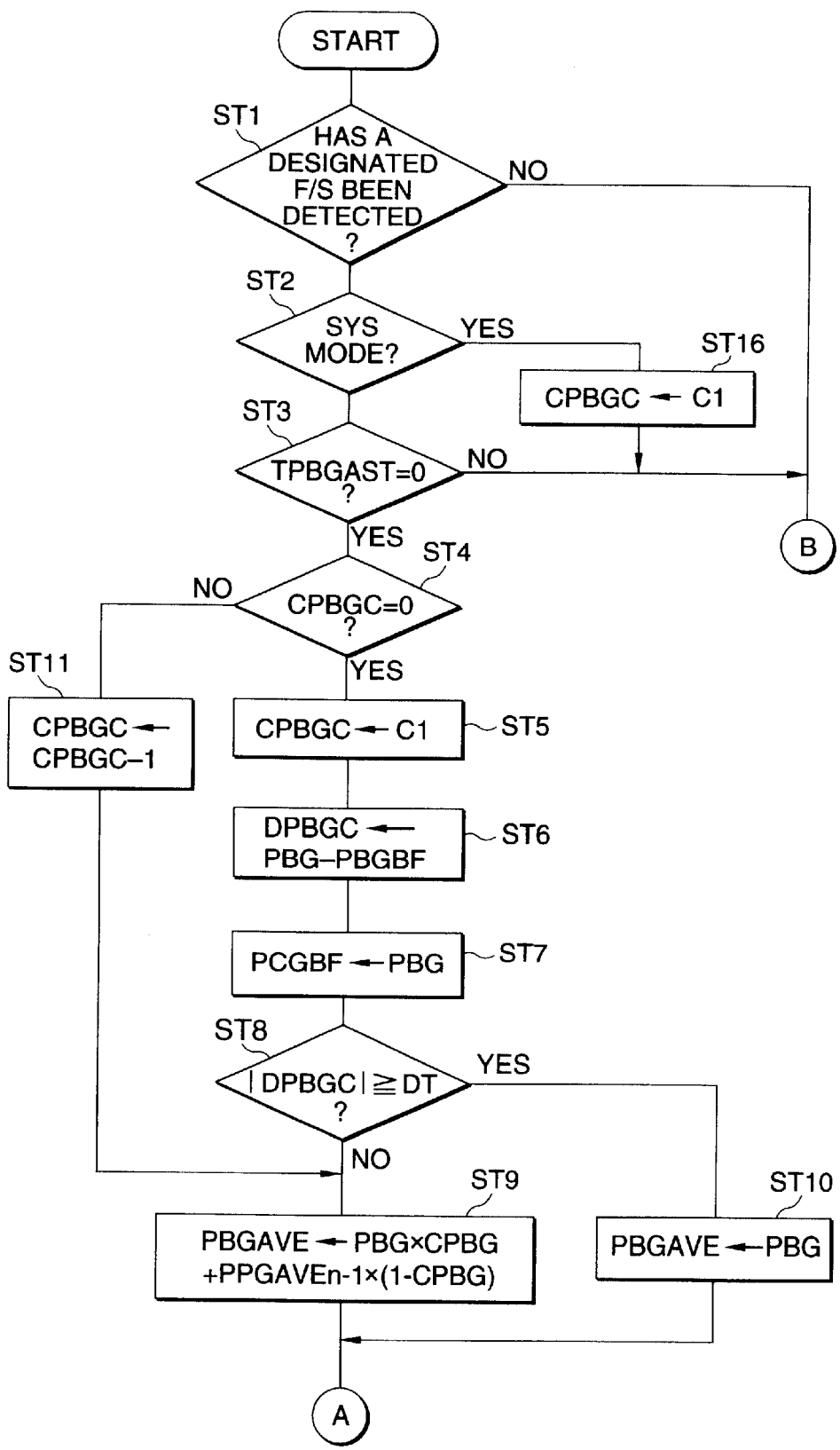
FIG. 2 is a diagram showing a former half of a control flow based on the invention.

Next, a description will be given the control of the air flow rate of secondary air supplied at the time of idling based on the control of the air flow rate control valve 9. The air flow rate of secondary air supplied during idling state is controlled by opening and closing the air flow rate control valve 9 as discussed above. To this end, a procedure for calculating a control value IMCD for providing an optional opening value will be described below with reference to a flowchart shown in FIG. 2.

For example, when the engine is determined to be in an idling state from a detected value of the aforesaid engine speed Ne, a control routine according to this invention starts. In Step ST1, whether or not a designated F/S (fail safe) has been detected is determined. This designate F/S is, for example, the determination of a disconnection of the gauge pressure sensor 12 or the like. In the event that the designated F/S has been detected, then the flow goes to Step ST2.

In Step ST2, whether or not the engine is in an SYS mode (SYSMOD=00 or 01) is determined. The SYS mode means a start or stop mode. In the event that the engine is determined not to be in the SYS mode, then the flow goes to Step ST3.

In Step ST3, whether or not the value of PBGAVE-timer TPBGAST has become zero "0" (time-up) after the start mode is determined, and when the time-up is determined, then the flow goes to Step ST4. In Step ST4, whether or not a counter CPBGC of a PBG averaged coefficient CPBG for use in calculating the intake gauge pressure PBG is counted up (=0) is determined. In the event that it is counted up, then the flow goes to Step ST5.

In Step ST5, the counter CPBGC is returned to an initial value C1, and in the following step ST6, an intake gauge pressure subtracted value DPBGC is calculated. This intake gauge pressure subtracted value DPBGC is obtained by subtracting the previous intake gauge pressure PBGBF from the present intake gauge pressure PBG. In the following step ST7, for calculation in ST6 for the following cycle, the value of the present intake gauge pressure PBG is substituted in the previous intake gauge pressure PBGBF, and then the flow goes to Step ST8.

In Step ST8, whether or not the value (the absolute value) of the intake gauge pressure subtracted value DPBGC obtained in Step ST6 is equal to or greater than an intake gauge pressure subtracted reference value DT is determined, and in the event that the value is determined to be less than the intake gauge subtracted reference value DT, then the flow goes to Step ST9, while the value is determined to be equal to or greater than the reference value, then the flow goes to Step ST10. In Step ST9, a PBGAVE which becomes a reference value for a secondary air correction coefficient table is calculated from the following expression.

$$PBGAVE = PBG \times CPBG + PBGAVE_{n-1} \times (1-CPBG) \quad (1)$$

According to the expression, CPBG is the PBG averaged coefficient, and $PBGAVE_{n-1}$ is a previously calculated PBGAVE. The PBGAVE obtained from this expression is the PBG averaged coefficient, which is calculated for preventing a variation when the engine is running in a stable condition. Note that in a case where the flow goes to Step ST10, the intake gauge pressure PBG is directly substituted into the reference intake gauge pressure PBGAVE without using the expression (1).

Note that in the event that the counter CPBGC is not counted up in Step ST4, the flow then goes to Step ST11, where the value of the counter CPBGC is subtracted by one, and then the flow goes to Step ST9.

Figure 3:
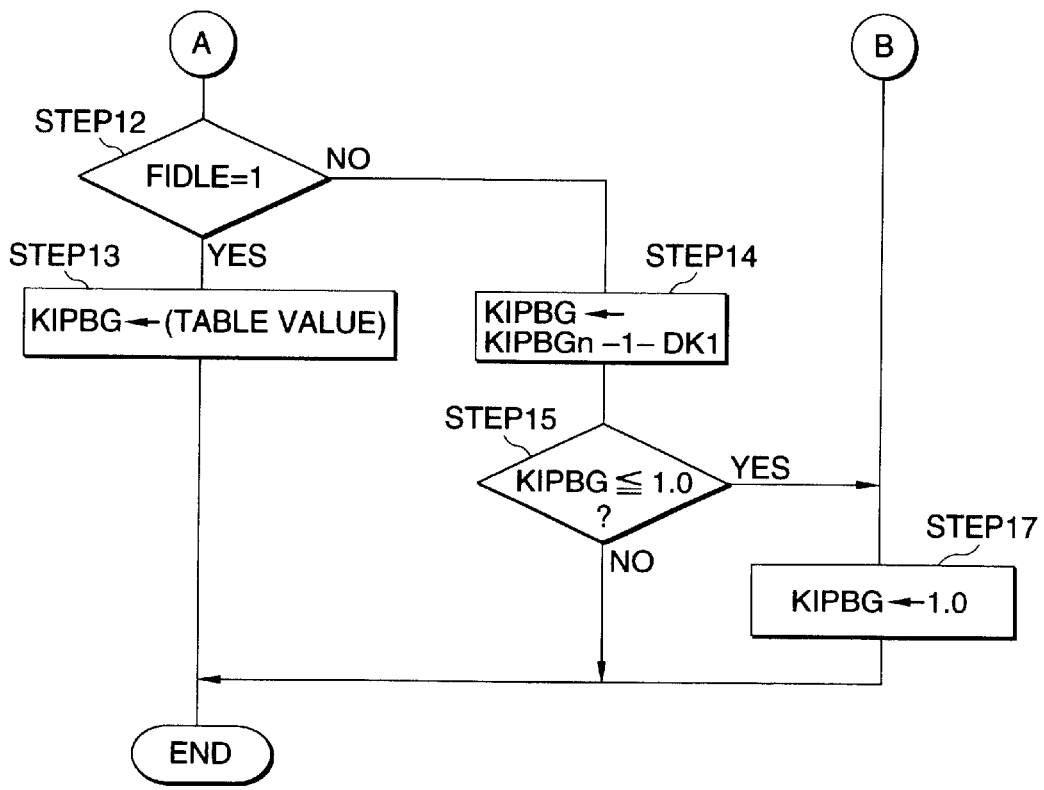
FIG. 3 is a diagram showing a latter half of the control flow based on the invention.

The procedure goes to Step ST12 shown in FIG. 3 after Step ST9 or Step ST10. In Step ST12, whether or not an idling flag FIDLE is set (=1) is determined, and in the event that the flag is set, then the flow goes to Step ST13, whereas in the event that the flag is not set, the flow goes to Step ST14.

Figure 4:
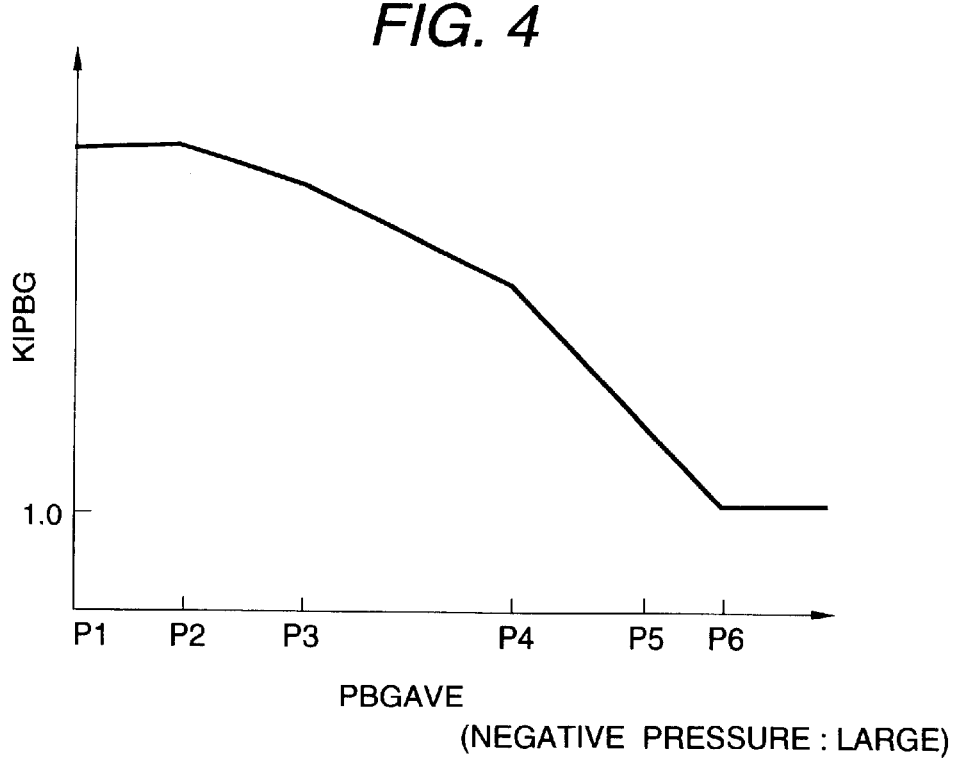
FIG. 4 is a diagram showing a table for use in obtaining a secondary air correction coefficient KIPBG according to the invention.

In Step ST13, a secondary air correction coefficient KIPBG read out from a secondary air correction coefficient table set as shown in FIG. 4 based on the invention is obtained. This ends the control routine of the invention.

Here, as shown in FIG. 4, the secondary air correction coefficient table is set such that the secondary air correction coefficient KIPBG increases from 1.0 as the reference intake gauge pressure PBGAVE increases (as the negative pressure decreases). Furthermore, the rate of increasing is set so as to decrease as the intake gauge pressure increases. Note that in the illustrated example, an optional number of points (P2 to P5) are provided between point P1 where the reference intake gauge pressure PBGAVE becomes the atmospheric pressure and P6 where a predetermined negative pressure is realized where the secondary air correction coefficient KIPBG may be set at 1.0, and the respective points are connected with polygonal lines. This facilitates the programming and arithmetic operation and can provide a smoother control when compared with a case where the correction coefficient table is set in a step-like fashion. Note that the number of point and setting positions are optional and they may be made optimal depending on engines.

Then, the opening value of the air flow rate control valve 9 is controlled using the secondary air correction coefficient KIPBG obtained in Step ST13, and the opening area of the bypass intake passage 10 varies in response to the controlled opening. Note that a target quantity ICMD of secondary air determining the opening value is obtained from the following expression.

$$ICMD = ((IFBN+IDP+ILOAD+IAF) \times KIPA+IPA) \times KIPBG \quad (2)$$

Where, IFBN is a term for the engine speed feedback; IPD: a term for a dash pot for adjusting the quantity of shot air when the speed is reduced; ILOAD: a term for load correction when lamps and/or an air conditioner are switched on; IAF: a term for air correction in response to a target air-fuel ratio; KIPA: a term for atmospheric pressure correcting multiplication; and IPA: a term for atmospheric pressure correcting addition.

Thus, the quantity of auxiliary (required) air can be increased or decreased in response to a variation in intake negative pressure by multiplying a quantity of air obtained from the electric load or the like by the secondary air correction coefficient KIPBG, whereby even in a case where the intake gauge pressure exceeds the normal level not only by the presence of an electric load but also by another factor such as the influence of a retarded ignition timing at the time of parking while idling in a high temperature atmosphere, such a change can be detected through a change in intake gauge pressure to thereby obtain an appropriate quantity of secondary air supply.

Additionally, in the event that the flow goes to Step ST14, the secondary air correction coefficient KIPBG is obtained by subtracting a predetermined value DKI from a secondary air correction coefficient $KIPBG_{n-1}$ in the previous cycle. This predetermined value DKI is a term for gradual subtraction from a KIPBG in engine states other than idling which is intended to prevent a drastic reduction. In Step ST15 following Step ST14, whether or not the secondary air correction coefficient KIPBG is equal to or less than 1.0 is determined, and in the event that the coefficient is determined to exceed 1.0, then the control routine of the invention is completed.

Note that in the event that the engine is determined to be in the SYS mode in Step ST2, then the flow goes to Step ST16, where the value of the timer TPBGAST is returned to an initial value TI, and the flow then goes to Step ST17. In addition, in the event that the designated F/S has not yet been detected in Step ST1 or in the event that the secondary air correction coefficient KIPBG is equal to or less than 1.0 in Step ST15, too, the flow goes to Step ST17, where the secondary air correction coefficient KIPBG is regarded as 1.0, and the control routing according to the invention is completed.

Thus, according to the invention, even in a case where the intake gauge pressure exceeds the normal level due to the influence of a retarded ignition timing in an idling state, in particular, at the time of parking while idling in a high temperature atmosphere, a high load being thereby applied to the engine, a variation in intake gauge pressure resulting therefrom can be detected to thereby obtain a quantity of secondary air supply matching the high load, whereby an unstable engine speed resulting at idling due to an insufficient quantity of secondary air supply can be prevented. In particular, the invention is effective when the activation of the lamps and air conditioner coincides with the increase in load resulting from the aforesaid engine condition.

Additionally, the quantity of secondary air supply can be controlled in a greater detailed and more preferred fashion through the construction in which the rate of the opening value of the secondary air supply device is controlled to decrease depending on the increasing intake gauge pressure, thereby making it possible to prevent the fluctuation of the feedback term in feedback controlling the engine idling speed.

While only certain embodiments of the invention have been specifically described herein, it will apparent that numerous modifications may be made thereto without departing from the spirit and scope of the invention.

What is claimed is:

1. An engine idling control device comprising:

a secondary air supply device disposed on a bypass intake passage communicating with an intake pipe and bypassing a throttle valve;

an intake gauge pressure detecting unit detecting an intake gauge pressure on the intake pipe side to provide an intake gauge pressure value; and a secondary air supply control unit controlling said secondary air supply device so as to open and close said bypass intake passage when an engine is in an idling state, said secondary air supply device being controlled so as to obtain a desired opening value, and wherein said secondary air supply control unit controls said secondary air supply device to increase the opening value when said intake gauge pressure value becomes higher than a predetermined value in a low load condition in an idling state.

2. The engine idling control device as set forth in claim 1, wherein an increasing rate of said opening value becomes smaller depending on said intake gauge pressure value becoming higher.

3. The engine idling control device as set forth in claim 1, wherein, when the difference between said intake gauge pressure and an intake gauge pressure previously detected is less than a predetermined value, said opening value is determined on the basis of the present and previous detected values of said intake gauge pressure.

* * * * *